United States Patent
Barker et al.

(10) Patent No.: US 10,440,942 B2
(45) Date of Patent: Oct. 15, 2019

(54) SPRAYER SYSTEMS WITH DROP APPARATUSES HAVING RETRACTABLE ARMS

(71) Applicant: Deere & Company, Moline, IL (US)

(72) Inventors: Mark E. Barker, Johnston, IA (US); Richard A. Humpal, Ankeny, IA (US)

(73) Assignee: DEERE & COMPANY, Moline, IL (US)

(*) Notice: Subject to any disclaimer, the term of this patent is extended or adjusted under 35 U.S.C. 154(b) by 18 days.

(21) Appl. No.: 15/890,594

(22) Filed: Feb. 7, 2018

(65) Prior Publication Data
US 2019/0239500 A1    Aug. 8, 2019

(51) Int. Cl.
*A01M 7/00*    (2006.01)
*B05B 1/20*    (2006.01)
(Continued)

(52) U.S. Cl.
CPC .......... *A01M 7/006* (2013.01); *A01C 23/047* (2013.01); *A01M 7/0042* (2013.01);
(Continued)

(58) Field of Classification Search
CPC .. A01M 7/0042; A01M 7/005; A01M 7/0053; A01M 7/006; A01M 7/0071;
(Continued)

(56) References Cited

U.S. PATENT DOCUMENTS

| 1,583,619 A | 5/1926 | Splittstoser |
| 2,144,890 A * | 1/1939 | Nakaoka ............... A01M 7/005 239/165 |

(Continued)

FOREIGN PATENT DOCUMENTS

| EP | 0600919 A1 | 6/1994 |
| EP | 3053435 A2 | 8/2016 |
| EP | 3456196 A1 | 3/2019 |

OTHER PUBLICATIONS

360 Yield Center, 360 Y-DROP Website: https://www.360yieldcenter.com/products/360-y-drop/, Copyright 2017.
(Continued)

*Primary Examiner* — Darren W Gorman
(74) *Attorney, Agent, or Firm* — Klintworth & Rozenblat IP LLP

(57) ABSTRACT

A sprayer system is provided for a work machine that includes a boom, a fluid source, and an air source. The sprayer system includes a spray device configured to selectively apply a fluid from the fluid source to an agricultural crop. A retractable arm includes a first arm segment, a second arm segment, a first hinge joint positioned such that the first arm segment is selectively foldable relative to the boom, and a second hinge joint positioned such that the second arm segment is selectively foldable relative to the first arm segment. An actuation assembly coupled to the retractable arm selectively folds and unfolds the first arm segment relative to the boom at the first hinge joint and the second arm segment relative to the first arm segment at the second hinge joint based on air pressure from the air source.

20 Claims, 12 Drawing Sheets

(51) Int. Cl.
  *A01C 23/04* (2006.01)
  *B05B 15/72* (2018.01)
(52) U.S. Cl.
  CPC .............. *A01M 7/0071* (2013.01); *B05B 1/20* (2013.01); *B05B 15/72* (2018.02)
(58) Field of Classification Search
  CPC ........ A01M 7/0075; B05B 1/20; B05B 15/70; B05B 15/72; A01C 7/004; A01C 23/047; A01B 63/10; A01B 63/1006; A01B 63/1013; A01B 63/24; A01B 63/32
  See application file for complete search history.

(56) References Cited

U.S. PATENT DOCUMENTS

| | | | | |
|---|---|---|---|---|
| 2,706,133 A * | 4/1955 | North, Jr. | .............. | A01M 7/006 239/550 |
| 3,117,725 A * | 1/1964 | Palmer | .................. | A01M 7/006 239/160 |
| 3,143,295 A * | 8/1964 | Booker | .............. | A01M 7/0092 239/127 |
| 3,285,516 A * | 11/1966 | Waldrum | .............. | A01M 7/005 239/102.1 |
| 3,478,967 A * | 11/1969 | Horton | .................. | A01M 7/006 239/169 |
| 4,010,900 A * | 3/1977 | Flix | ....................... | A01M 7/006 172/155 |
| 5,326,030 A | 7/1994 | Benest | | |
| 5,516,044 A | 5/1996 | Thorstensson | | |
| 5,709,343 A * | 1/1998 | Myers | .................. | B05B 15/628 239/730 |
| 7,077,070 B1 | 7/2006 | Williams | | |
| 9,167,745 B2 | 10/2015 | Muff | | |
| 2013/0043326 A1 | 2/2013 | Muff | | |
| 2014/0263730 A1 * | 9/2014 | Gednalske | .......... | A01M 7/0064 239/159 |
| 2018/0049381 A1 * | 2/2018 | Parod | .................. | A01M 7/0075 |

OTHER PUBLICATIONS

Applicant Deere & Company, pending Utility U.S. Appl. No. 15/703,797, Sprayer Systems With Retractable Drop Apparatuses, filed Sep. 13, 2017.

Extended European Search Report for application No. 19155569 dated Jun. 11, 2019.

* cited by examiner

SPRAYER SYSTEMS WITH DROP APPARATUSES HAVING RETRACTABLE ARMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to fluid sprayer systems such as those used in agriculture, manufacturing, and industrial applications.

BACKGROUND OF THE DISCLOSURE

Large sprayer systems apply nutrients, herbicides, paints, chemicals and other liquids such as those used in the agriculture or manufacturing industries. These systems tend to have large physical structures, particularly boom assemblies that extend outwardly perpendicular to the direction of travel and support fluid distribution pipes and spray devices for the distribution of liquid across a wide geographical area. In some applications, the spray devices are mounted on drop apparatuses along the underside of the boom assemblies that position the spray devices closer to the ground. However, the size of the boom assemblies and associated components may present challenges when transporting or maneuvering the sprayer systems.

SUMMARY OF THE DISCLOSURE

The disclosure provides a system and method for applying fluids, such as those used in agriculture, manufacturing, and industrial applications In one aspect, a sprayer system is provided for a work machine that includes a boom, a fluid source, and an air source. The sprayer system includes a spray device configured to selectively apply a fluid from the fluid source to an agricultural crop. The sprayer system further includes a drop apparatus with a retractable arm with a first end coupled to the boom and a second end coupled to the spray device. The retractable arm includes a first arm segment, a second arm segment, a first hinge joint positioned in between the first arm segment and the boom such that the first arm segment is selectively foldable relative to the boom, and a second hinge joint positioned in between the first arm segment and the second arm segment such that the second arm segment is selectively foldable relative to the first arm segment. The drop apparatus further includes an actuation assembly coupled to the retractable arm to selectively fold and unfold the first arm segment relative to the boom at the first hinge joint and the second arm segment relative to the first arm segment at the second hinge joint based on air pressure from the air source.

In another aspect, an agricultural work machine includes a chassis; an engine mounted on the chassis for propelling the work machine; a boom extending from at least one side of the chassis; and a sprayer system. The sprayer system includes a tank coupled to the chassis; an air source coupled to the chassis; at least one spray device arranged to selectively apply a fluid from the tank to an agricultural crop; and at least one drop apparatus. The at least one drop apparatus includes a retractable arm and an actuation assembly. The retractable arm includes a first end coupled to the boom and a second end coupled to the at least one spray device. The retractable arm further includes a first arm segment, a second arm segment, a first hinge joint positioned in between the first arm segment and the boom such that the first arm segment is selectively foldable relative to the boom, and a second hinge joint positioned in between the first arm segment and the second arm segment such that the second arm segment is selectively foldable relative to the first arm segment. The actuation assembly is coupled to the retractable arm to selectively fold and unfold the first arm segment relative to the boom at the first hinge joint and the second arm segment relative to the first arm segment at the second hinge joint based on air pressure from the air source.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed sprayer systems and methods, as shown in the accompanying figures of the drawings described briefly above. Various examples herein refer to the context of a sprayer system for crops. It will be understood, however, that the disclosed sprayer system may be utilized in a variety of settings. It will also be understood that, while terms such as "top," "bottom," "upper," "lower," "clockwise," "counterclockwise" and the like may be utilized below with respect to an orientation or operation depicted in a particular figure, such terms may be used in a relative sense and are not intended to limit the disclosure to the particular orientation or operation described. Various modifications to the example embodiments may be contemplated by one of skill in the art.

Figure 1:
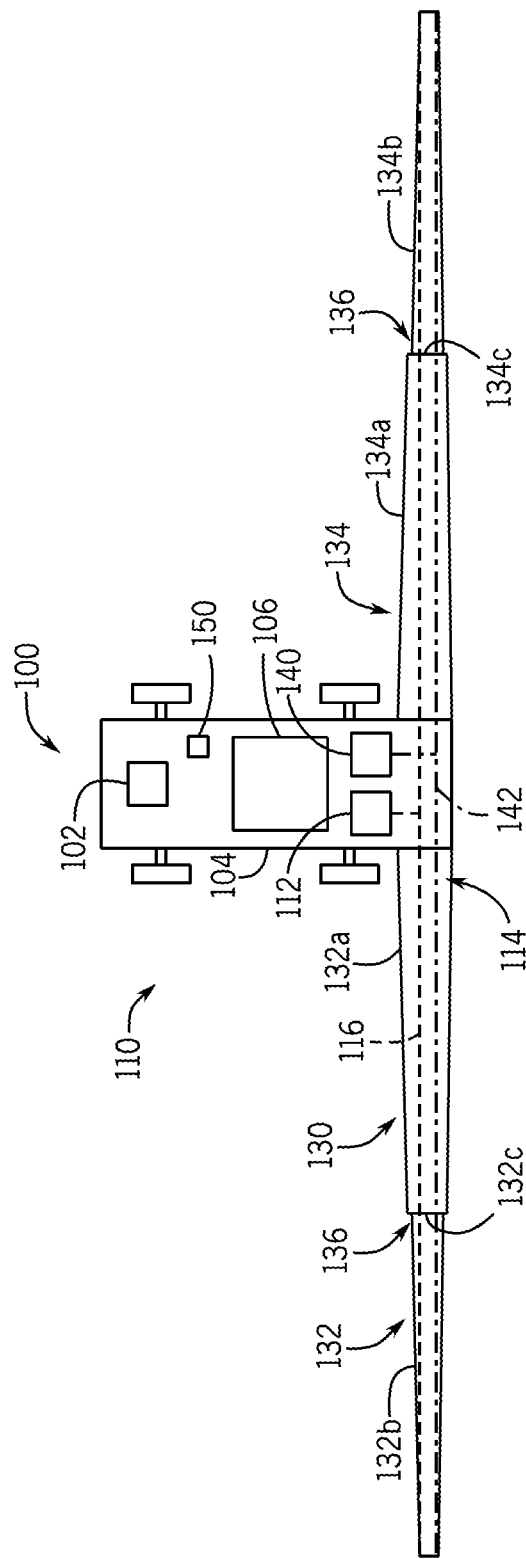
FIG. 1 is a top plan view of an example sprayer system in the form of a vehicle work machine in which retractable drop apparatuses according to this disclosure may be implemented.

FIG. 1 depicts an example work machine (or vehicle) 100 into which a sprayer system 110 is integrated. Generally, the work machine 100 is a self-propelled agricultural sprayer with an engine 102 that powers a propulsion system (e.g., a drive train, transmission, wheels, etc.) to propel and navigate the work machine 100 into appropriate positions and locations for application of fluid (e.g., chemical solutions, water, etc.) by the sprayer system 110. The work machine 100 may have a chassis 104 to support the engine 102 and other aspects of the machine 100, including an operator cabin 106, a supply tank 112 of the sprayer system 110, and a boom assembly 130. Other systems may include transmission, brake and steering assemblies, human-machine interfaces, and machine communication components. Although not shown or discussed further in detail, the work machine 100 may include various machine or vehicle components appropriate for the relevant industry. Various sensors may also be provided to observe various conditions associated with the work machine 100, particularly one or more location sensors, such as GPS receivers or inertial measurement units, that provide signals to the controller 150 to ascertain the location and position of the work machine 100. Although depicted as a self-propelled vehicle, in some embodiments, the sprayer system 110 may be embodied as a towed system, e.g., by a separable tractor or truck.

As introduced above, the work machine 100 includes a boom assembly 130 to facilitate application of the fluids by the sprayer system 110. For example, the boom assembly 130 functions to support aspects of the sprayer system 110 in applying fluids in the desired target area. As described in greater detail below, the boom assembly 130 may support an array of spray devices at predetermined intervals to apply fluids across multiple rows of agricultural products at a time.

The boom assembly 130 may be a generally rigid framework of tubular or solid frame structures. For example, the boom assembly 130 may have upper and lower carriers interconnected with numerous struts forming a trussed arrangement. As presented in the example below, the boom assembly 130 may include several booms, and each boom may have several sections, such as of decreasing size moving outward, that are coupled together to extend in total to lengths of near or over 100 feet.

As shown, the boom assembly 130 is mounted on the back of the machine 100 and may include a left boom (or wing) 132 and a right boom (or wing) 134 extending from a respective side of a center rack of the vehicle. The left boom 132 and right boom 134 of the boom assembly 130 may each have a plurality (e.g., two, three, or more) of sections, although in some examples, the boom may have only a single section. In the depicted example, each boom 132, 134 of the boom assembly 130 may include an inner section 132a, 134a mounted on the chassis 104 and an outer section 132b, 134b mounted to the inner section 132a, 134a.

In an operating position such as that shown in FIG. 1, the boom assembly 130 may have a relatively wide wingspan or footprint that may be challenging with respect to maneuvering, transport, and/or storage. As such, the boom assembly 130 may include folding arrangements 136 that function to facilitate the folding of the booms 132, 134 in a generally horizontal plane. In one embodiment, the booms 132, 134 may be folded at hinges 132c, 134c between spray boom sections 132a, 132b; 134a, 134b, thereby resulting in a smaller overall wingspan. In other words, boom section 132b may be folded onto boom section 132a at hinge 132c, and boom section 134b may be folded onto boom section 134a at hinge 134c. Although not shown, the folding arrangements 136 may further include actuation devices (e.g., hydraulic actuators or motors) to facilitate folding. Additional details regarding the folding operation are provided below.

During typical operation, the sprayer system 110 may operate during an application cycle to direct the fluid from the supply tank 112, through a series of pipes, conduits, hoses, pumps, valves and/or the like (e.g., "plumbing" 114), and out of one or more spray devices. In one example, the plumbing 114 may include supply conduits 116 extending across the length of each boom 132, 134 and hoses that fluidly couple the supply conduit 116 to each spray device. Additionally, the sprayer system 110 may include pneumatic components to facilitate operation as described in greater detail below. In one example, the sprayer system 110 may include an air source 140 that provides pressurized air and air supply hoses 142 that transfer air from the air source 140 to the various components described below. Although not shown, other example pneumatic or fluid components may include compressors, pumps, tanks, valves, and the like. Generally, operation of the sprayer system 110 may be managed by a controller 150, automatically and/or in accordance with operator commands, as described in greater detail below.

As introduced above, operation of the machine 100 may be controlled by a control system with a controller 150, which may be configured as a computing device with associated processor devices and memory architectures, as a hard-wired computing circuit (or circuits), as a programmable circuit, as a hydraulic, electrical or electro-hydraulic controller, or otherwise. As such, the controller 150 may be configured to execute various computational and control functionality with respect to the work machine 100 and/or sprayer system 110, as well as the associated components discussed below. In some embodiments, the controller 150 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 150 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 150 may be in electronic, hydraulic, mechanical, or other communication with various other systems or devices, such as various actuators, sensors, and other devices within (or outside of) the work machine 100. The controller 150 may communicate with other systems or devices (including other controllers) in various known ways, including via a CAN bus (not shown), via wireless or hydraulic communication means, or otherwise. The controller 150 is typically arranged on the work machine 100, although other locations are possible including various remote locations.

In some embodiments, the controller 150 may be configured to receive input commands and to interface with an operator via a human-machine interface, which may be disposed inside a cab of the work machine 100 for easy access by the operator. The human-machine interface may be configured in a variety of ways, including an input device with one or more joysticks, various switches or levers, one or more buttons, a touchscreen interface that may be overlaid on a display, a keyboard, a speaker, a microphone associated with a speech recognition system, or various other human-machine interface devices. A display of the interface may be implemented as a flat panel display or other display type that is integrated with an instrument panel or console of the work machine 100.

The controller 150 may include and/or cooperate with a communication component, which may be any suitable system for receiving data from and transmitting data, such as a Bluetooth® transceiver, a satellite transceiver, a radio transceiver, a cellular transceiver, an LTE transceiver and/or a Wi-Fi transceiver. Further details regarding operation of the controller 150 will be provided below.

Accordingly, during operation in one embodiment, the controller 150 may monitor a number of input parameters, including location signals, timing considerations, and/or environmental data. The controller 150 may also receive user input, e.g. from a user input device or communications system. In response, the controller 150 may send control signals to actuate various aspects of the sprayer system 110, work machine 100, and the components described in greater detail below, including the application of fluid through the sprayer system 110, as well as folding and unfolding the boom assembly 130 and/or retracting and extending the spray devices. In one embodiment, the controller 150 may store and implement preprogrammed instructions that automatically perform the functions described below, although other examples may utilize operator intervention.

Figure 2:
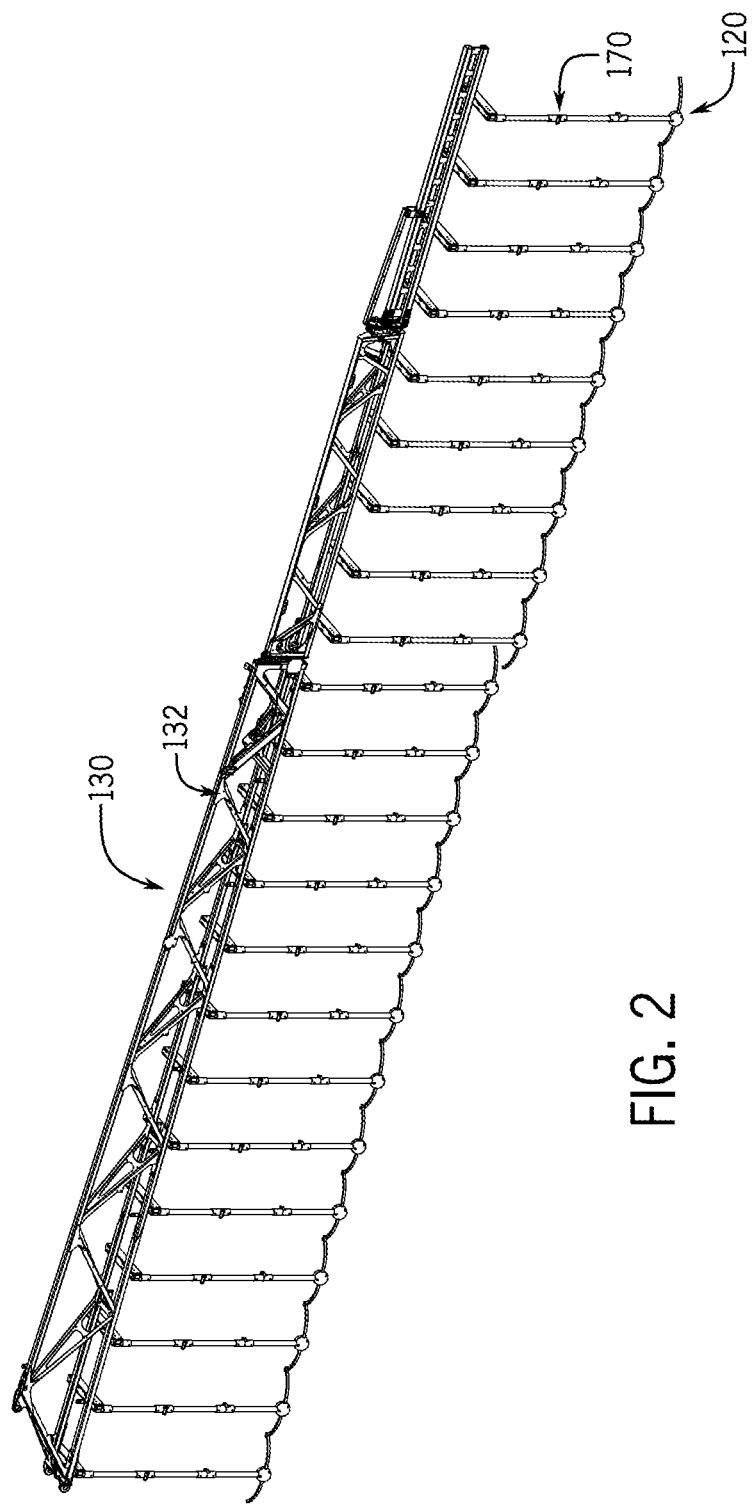
FIG. 2 is a partial front isometric view of a boom of the work machine of FIG. 1 with an array of drop apparatuses in extended positions.
Figure 3:
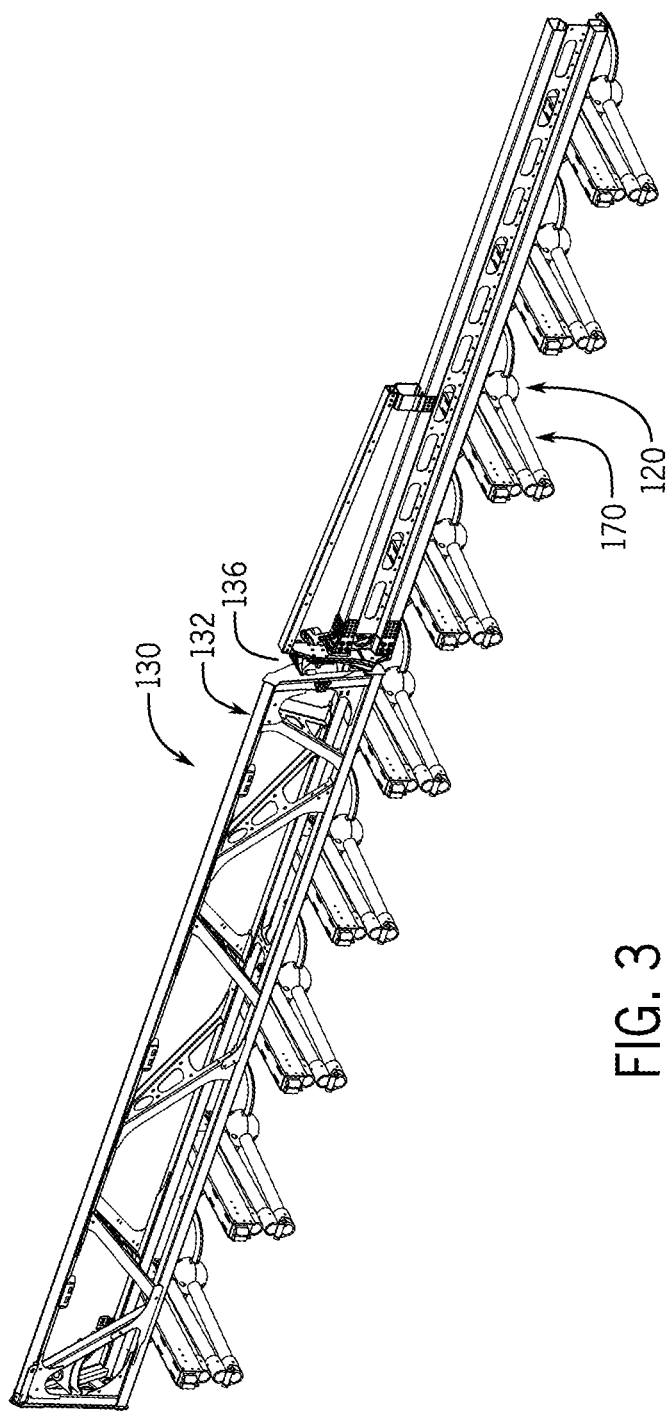
FIG. 3 is a closer partial front isometric view of the drop apparatuses of FIG. 2 in retracted positions.

FIG. 2 is a partial isometric view of a boom 132 of the boom assembly 130 of FIG. 1 and particularly provides an example of drop apparatuses 170 mounting spray devices 120 to the boom assembly 130 in extended positions for application of fluid at or near the ground level. FIG. 3 is a closer, partial isometric view of the drop apparatuses 170 mounting the spray devices 120 to the boom assembly 130 in retracted positions for travel, transport, storage, and/or repositioning of the work machine 100. The boom 132 in FIGS. 2 and 3 is the left boom, although the right boom 134 (FIG. 1) may have similar features.

As noted above and shown in FIGS. 2 and 3, the sprayer system 110 includes an array of spray devices 120 that receive fluid from the supply tank 112 (FIG. 1) via the plumbing 114 (FIG. 1) for application of the fluid. Each of the spray devices 120 is mounted to the underside of the boom assembly 130 with a drop apparatus 170. As described in greater detail below, the drop apparatuses 170 are retractable and extendable to raise and/or lower the spray devices 120 relative to the ground and to boom assembly 130. As such, the drop apparatuses 170 may be raised into a retracted position for storage or maneuvering and/or lowered into an extended position for fluid application. In one embodiment, the drop apparatuses 170 may further cooperate with folding arrangements 136 to facilitate the folding of the boom assembly 130, thereby enabling more effective and efficient maneuvering, storage, and transport. Additional details about the drop apparatuses 170 will be provided below.

Figure 4:
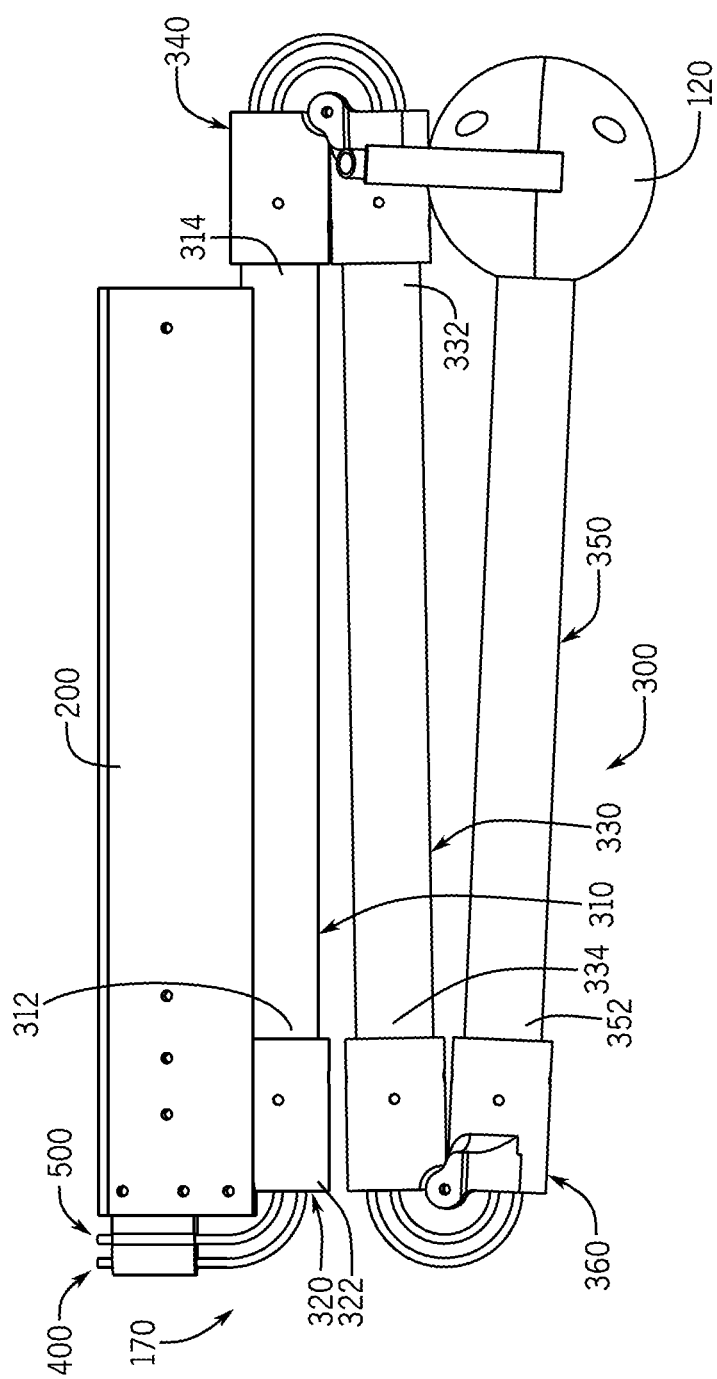
FIG. 4 is a side view of one of the drop apparatuses of FIG. 2 in the retracted position.
Figure 5:
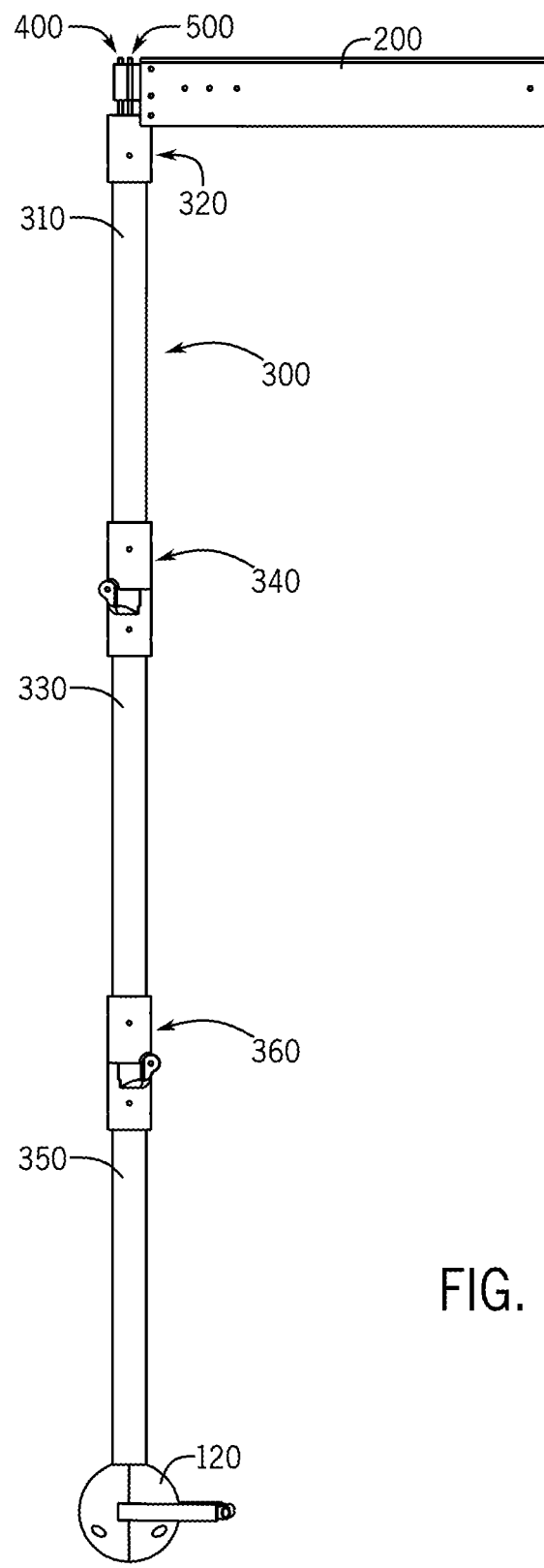
FIG. 5 is a side view of the drop apparatus of FIG. 4 in the extended position.
Figure 6:
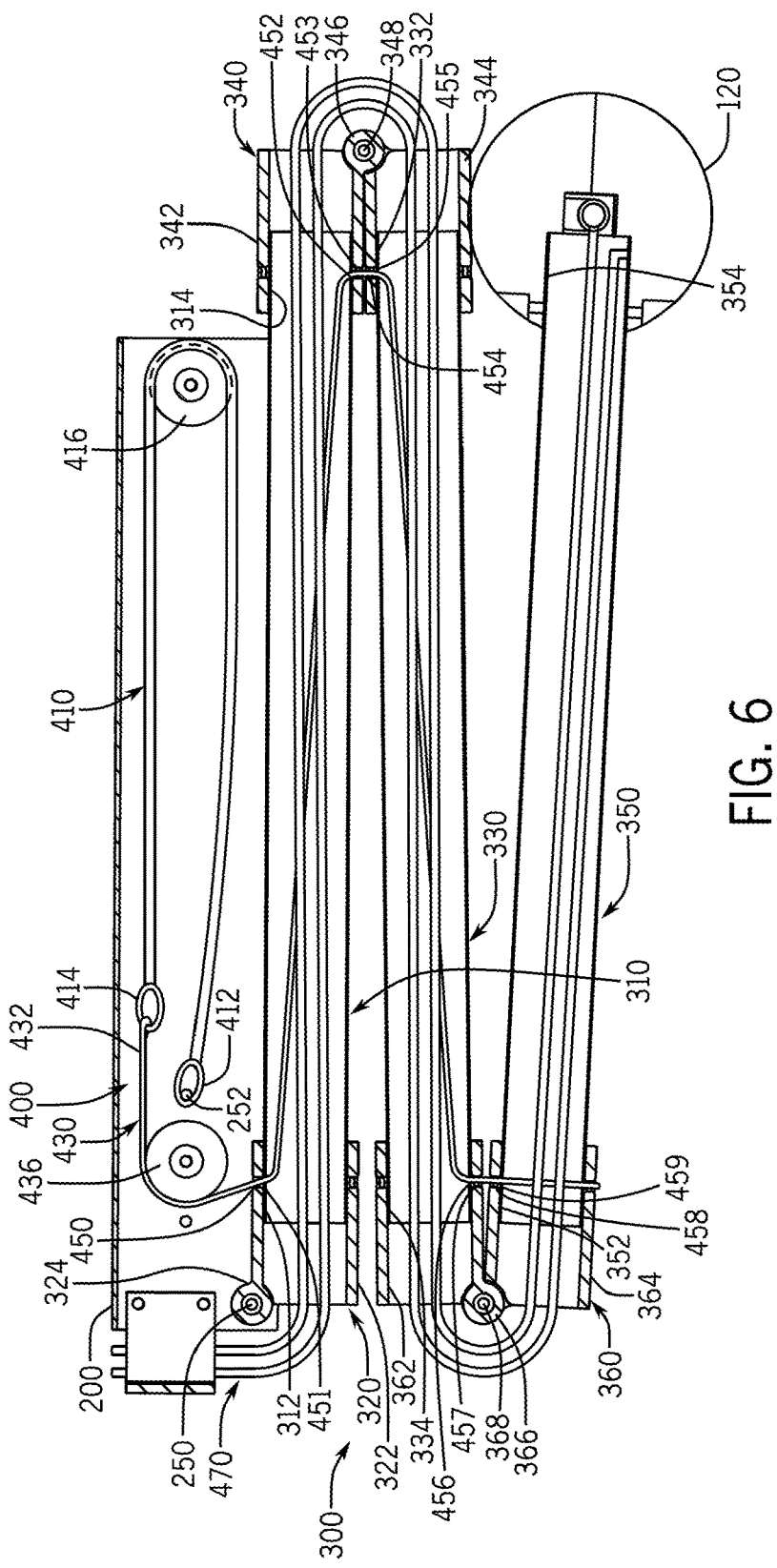
FIG. 6 is a cross-sectional view of the drop apparatus of FIG. 4 in the retracted position.
Figure 7:
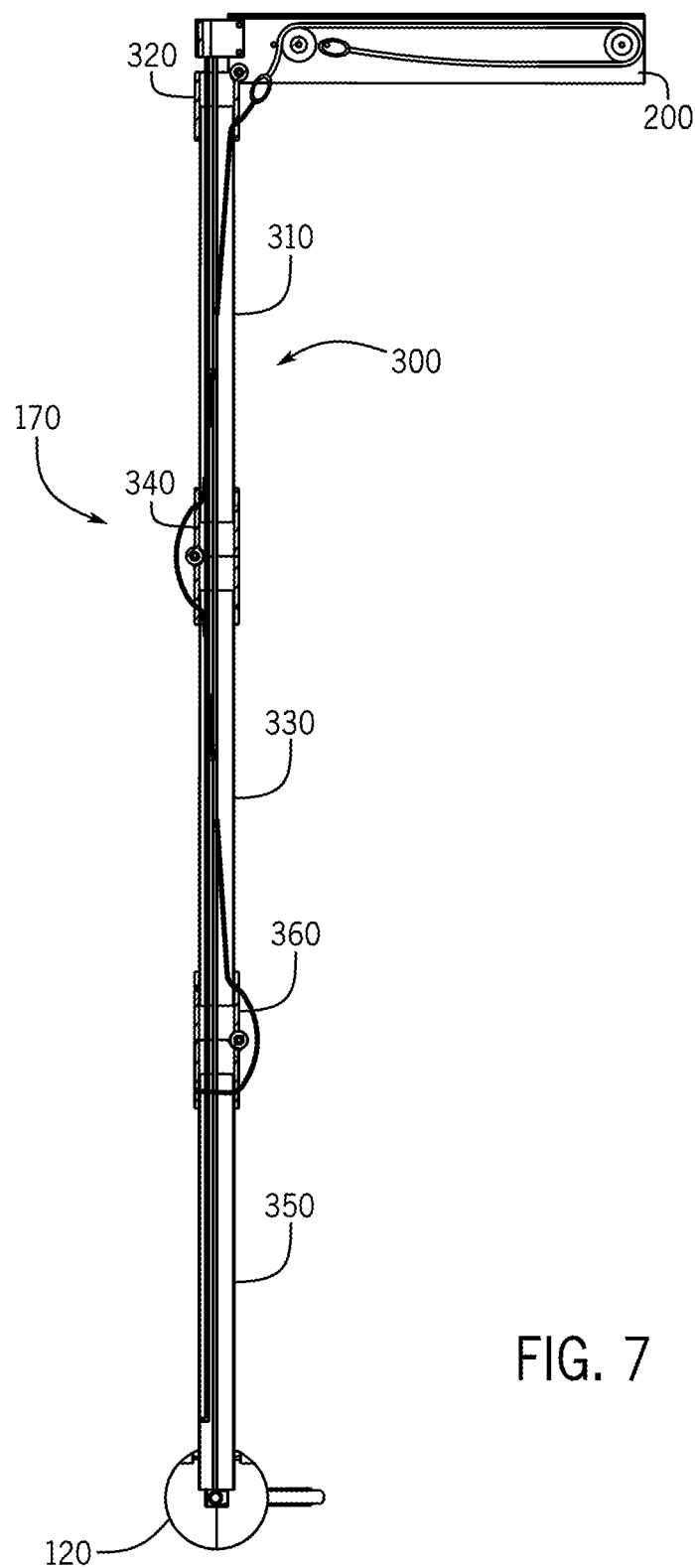
FIG. 7 is a cross-sectional view of the drop apparatus of FIG. 5 in the extended position.

Reference is now made to FIGS. 4-7. FIGS. 4 and 5 are side views of one of the drop apparatuses 170 in the retracted position and the extended position, respectively. FIGS. 6 and 7 are cross-sectional views of the drop apparatus 170 corresponding to FIGS. 4 and 5, respectively. In FIGS. 4-7, the drop apparatus 170 has been removed from the boom assembly 130 (FIGS. 1 and 2).

As shown, the drop apparatus 170 may be considered to include a base bracket 200, a retractable arm 300, an actuation assembly 400, and/or a fluid hose 500. Generally, as described in greater detail below, the base bracket 200 is mounted to the boom assembly 130 and supports the retractable arm 300 on the boom assembly 130. The spray device 120 is mounted proximate to the distal end of the retractable arm 300 relative to the base bracket 200, such that the spray device 120 is coupled to the boom assembly 130 with the drop apparatus 170. The actuation assembly 400 may include a number of components, some of which may be mounted on, or proximate to, the base bracket 200 and the retractable arm 300. The actuation assembly 400 operates to extend (or unfold) the retractable arm 300 into an extended position and retract (or fold) the retractable arm 300 into a retracted position to vertically reposition the spray device 120, as described below.

Generally, the retractable arm 300 is formed by at least two arm segments 310, 330, 350 cooperating with a number of hinge joints 320, 340, 360. In the example of FIGS. 4-7, the retractable arm 300 has three arm segments 310, 330, 350, but in other examples, the retractable arm 300 may have additional arm segments or fewer arm segments. Each arm segment 310, 330, 350 is formed with a generally cylindrical, elongated structure that may accommodate sprayer system components extending therethrough, as discussed in greater detail below. As one example, the arm segments 310, 330, 350 may be formed from aluminum, and the hinge joints 320, 340, 360 may be formed from plastic, although other materials may be used for the segments and joints.

As most clearly shown in FIG. 6, the first arm segment 310 has a first end 312 coupled to the base bracket 200 with the first hinge joint 320. In this example, the first hinge joint 320 is formed by a hinge sleeve 322 that mates with the first end 312 of the first arm segment 310. In one example, the hinge sleeve 322 may have a cylindrical shape that receives and retains the cylindrical first end 312 of the first arm segment 310. The first hinge joint 320 may additionally include a pivot element 324 fixed to the hinge sleeve 322 that is pivotably mounted to the base bracket 200. For example, the pivot element 324 may capture a horizontal axle element 250 fixed to the base bracket 200 in a manner than enables the pivot element 324 to pivot about the horizontal axle element 250 of the base bracket 200. As a result of this arrangement, the first arm segment 310 may selectively pivot relative to the base bracket 200 via the hinge joint 320. In one example, the first arm segment 310 may pivot approximately 90° relative to the base bracket 200 between the retracted and extended positions.

A second end 314 of the first arm segment 310 is coupled to a first end 332 of the second arm segment 330 with the second hinge joint 340. In this example, the second hinge joint 340 is formed by a first hinge sleeve 342 that mates with the second end 314 of the first arm segment 310 and a second hinge sleeve 344 that mates with the first end 332 of the second arm segment 330. Each hinge sleeve 342, 344 may have a cylindrical shape that receives and retains the respective cylindrical segment end 314, 332. The second hinge joint 340 may additionally include pivot elements 346, 348 attached to the hinge sleeves 342, 344 that cooperate to enable each hinge sleeve 342, 344 to pivot relative to one another while maintaining the connection. The pivot elements 346, 348 may take any suitable form, including a barrel or knuckle and pin arrangement. As a result of this arrangement, the second arm segment 330 may selectively pivot relative to the first arm segment 310 via the hinge joint 340. In one example, the second arm segment 330 may pivot approximately 180° relative to the first arm segment 310 between retracted and extended positions.

A second end 334 of the second arm segment 330 is coupled to a first end 352 of the third arm segment 350 with the third hinge joint 360. In this example, the third hinge joint 360 is formed by a first hinge sleeve 362 that mates with the second end 334 of the second arm segment 330 and a second hinge sleeve 364 that mates with the first end 352 of the third arm segment 350. Each hinge sleeve 362, 364 may have a cylindrical shape that receives and retains the respective cylindrical segment end 334, 352. The third hinge joint 360 may additionally include pivot elements 366, 368 attached to the hinge sleeves 362, 364 that cooperate to enable each hinge sleeve 362, 364 to pivot relative to one another while maintaining the connection. The pivot elements 366, 368 may take any suitable form, including a barrel or knuckle and pin arrangement. As a result of this arrangement, the third arm segment 350 may selectively pivot relative to the second arm segment 330 via the hinge joint 360. In one example, the third arm segment 350 may pivot approximately 180° relative to the second arm segment 330 between the retracted and extended positions.

As described in greater detail below, the spray device 120 is attached to the second end 354 of the third arm segment 350. Although only three arm segments 310, 330, 350 are depicted in this example, additional arm segments and hinge joints may be provided to increase the overall length of the retractable arm 300 with the spray device 120 be mounted on the final arm segment. Similarly, the arm 300 may only have two arm segments with the spray device mounted on the distal end of the second arm segment.

As shown in a comparison between FIG. 6 and FIG. 7, the arm segments 310, 330, 350 and hinge joints 320, 340, 360 cooperate to enable the retractable arm 300 to be raised and lowered relative to the ground between the extended and retracted positions. As noted above, the actuation assembly 400 provides the force suitable for repositioning the retractable arm 300.

The actuation assembly 400 is most clearly depicted in the cross-sectional views of FIGS. 6 and 7. Initially referring to FIG. 6, in this example, the actuation assembly 400 includes a retraction spring 410 generally housed within the base bracket 200. The retraction spring 410 includes a first end 412 fixed to an anchor or mount 252 within the base bracket 200. The actuation assembly 400 further includes a retention cable 430 with a first end 432 coupled to a second end 414 of the retraction spring 410. As such, with the first end 412 fixed to the anchor 252, a pulling on the retention cable 430 operates to bias or extend the spring 410 and a release of the tension operates to relax or return the spring 410 to an initial or default position. As described below, the spring 410 may be preloaded under tension such that the retracted position depicted in FIG. 6 is the default position. The spring 410 and cable 430 may collectively be considered a retraction device.

Generally, the retraction spring 410 may have any suitable arrangement. In the depicted example, the retraction spring 410 is supported by a spring guide 416 mounted on the base bracket 200. Similarly, a cable guide 436 may be provided on the base bracket 200 to guide or position the cable 430. As shown, the cable 430 may extend from the end of the retraction spring 410, around the cable guide 436, and out of the base bracket 200.

The cable 430 generally extends from the base bracket 200 to the lowest arm segment (e.g., the third arm segment 350) or the lowest hinge joint (e.g., the third hinge joint 360). As shown in this example, the cable 430 extends through portions of each of the arm segments 310, 330, 350 and hinge joints 320, 340, 360 to an anchor point in the third arm segment 350. Primarily, the cable 430 extends through the interior of the retractable arm 300, although the cable 430 may be threaded in and out of the interior of the retractable arm 300 to facilitate the retraction function, as described below.

The arm segments 310, 330, 350 and hinge joints 320, 340, 360 may accommodate the cable 430 through a number of cable openings 450-459 in which the cable 430 enters or exits the respective segment 310, 330, 350 or hinge joint 320, 340, 360. For example, the sleeve 322 of the first hinge joint 320 includes a cable opening 450 and the first arm segment 310 includes a further cable opening 451 aligned with the cable opening 450 such that the cable 430 may extend from the base bracket 200 into the interior of the first arm segment 310. The cable 430 extends through the first arm segment 310 to a position proximate the second end 314 of the first arm segment 310. From the first arm segment 310, the cable 430 extends through aligned cable openings 452, 453, 454, 455 in the first arm segment 310, the first and second sleeves 342, 344 of the second pivot joint 340, and the second arm segment 330 into the interior of the second arm segment 330.

The cable 430 extends through the second arm segment 330 to a position proximate the second end 334 of the second arm segment 330. From the second arm segment 330, the cable 430 extends through aligned cable openings 456, 457, 458, 459 in the second arm segment 330, the first and second sleeves 362, 364 of the third pivot joint 360, and the third arm segment 350 into the interior of the third arm segment 350. In this example, the cable 430 is anchored to an interior surface of the third arm segment 350.

The cable openings 450-459 in the arm segments 310, 330, 350 and hinge joints 320, 340, 360 are positioned and oriented to provide suitable moment arms and force vectors in order to more effectively raise and lower the arm segments 310, 330, 350 between the retracted and extended positions. In further examples, other placements and arrangements may be provided.

In one example, the spring 410 may be preloaded with a predetermined tension or spring force to retain the retractable arm 300 in the retracted position as a default. In particular, unless otherwise opposed, the force of the spring 410 is sufficient to lift the weight of the arm segments 310, 330, 350 up into the retracted position by exerting a force on the third arm segment 350. Under tension, the routing of the cable 430 functions to collapse the retractable arm 300 at the hinge joint 320, 340, 360 such that the first and second arm segments 310, 330 are pulled up with the third arm segment 350. In effect, the spring 410 pulls the arm 300 via the cable 430 to fold the arm segments 310, 330, 350 at the hinge joints 320, 340, 360 for a raised and compact arrangement.

The actuation assembly 400 further includes an air hose 470 that operates to selectively oppose the force of the spring 410 in order to extend the retractable arm segments 310, 330, 350 from the retracted position into the extended position. As shown, the air hose 470 extends from the base bracket 200 and through each of the arm segments 310, 330, 350 and hinge joints 320, 340, 360 to at least the last arm segment (e.g., the third arm segment 350). Although not shown in FIGS. 6 and 7, an upper end of the air hose 470 may be fluidly coupled to the air source 140 (FIG. 1) via air supply hoses 142 (FIG. 1).

During operation, the air hose 470 may be pressurized (e.g., supplied with air from air source 140) or unpressurized (e.g., not supplied with air). In an unpressurized state, the air hose 470 is flexible, and in the pressurized state, the air hose 470 stiffens. As an example, the air hose 470 in FIG. 6 is unpressurized such that the air hose 470 is generally collapsed or otherwise flexible enough to be folded through each of the pivoted hinge joints 320, 340, 360.

Upon being pressurized, the air hose 470 stiffens and straightens along a longitudinal axis to apply a force to the interior walls of the retractable arm 300. As air pressure increases and the air hose 470 continues to stiffen, the force of the air hose 470 overcomes the spring force from the spring 410 operating on the folded arm segments 310, 330, 350 via the cable 430. The force of the air hose 470 operates to close or unfold the hinge joints 320, 340, 360 such that the arm segments 310, 330, 350 align along the longitudinal axis to place the retractable arm 300 in the extended position. Upon reaching this position, the pressure within the air hose 470 may be maintained such that the retractable arm 300 remains in the extended position until the air pressure is released. Upon release of the air pressure, the air hose 470 becomes flexible enough for the spring 410 to return the retractable arm 300 into the retracted position, as discussed above.

Although not shown in FIGS. 6 and 7, the actuation assembly 400 may further include or otherwise interact with a controller 150 (FIG. 1) and at least one sensor (not shown) to facilitate operation between the extended and retracted positions. In some examples, the controller 150 may be part of the sprayer system or work machine controller 150 and interact with a user interface to receive commands and generate feedback or messages for the user. In other examples, the controller for the actuation assembly 400 may be a stand-alone controller. Generally, the controller 150 is configured to control the air supply to the air hose 470 such that an appropriate amount of air pressure is provided to the air hose 470 for the desired position. For example, the sensor may function to determine the amount of air pressure within the hose 470 and communicate the determined air pressure to the controller 150. This enables the controller 150 to ensure that sufficient air pressure is supplied to overcome the spring force of the retraction spring 410, thereby enabling the extension (and subsequent maintenance) of the retractable arm 300 in the extended position. Upon receiving a signal to reposition the retractable arm 300 into the retracted position, the controller 150 may command the termination of the air supply and/or release the air pressure within the air hose 470 such that the spring force of the retraction spring 410 pulls the retractable arm 300 into the retracted position. Accordingly, the actuation assembly 400 may operate to reposition the retractable arm 300 based on commands from the controller 150.

Figure 8:
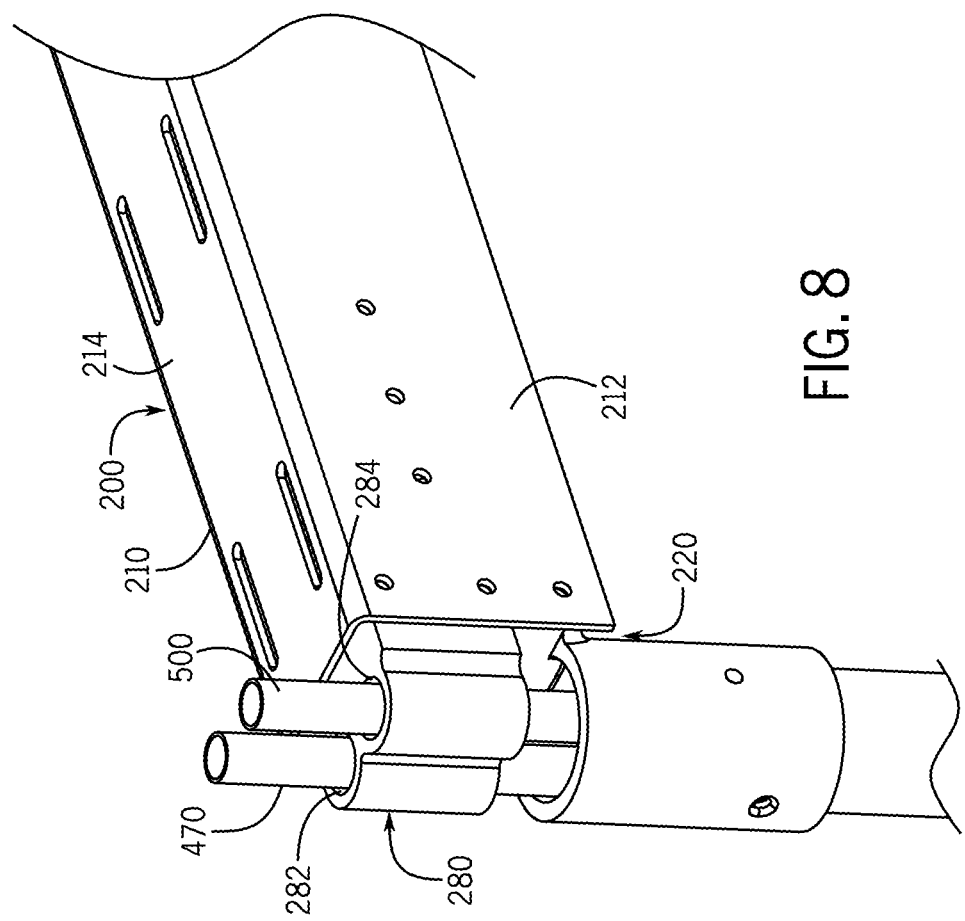
FIG. 8 is an isometric view of one end of a base bracket of the drop apparatus of FIG. 4.

FIG. 8 is a closer isometric view of a portion of the base bracket 200 and particularly depicts a hose guide 280 mounted on the end of the base bracket 200. As shown, the base bracket 200 is generally C-shaped and formed by two side walls 210, 212 and a top wall 214. The top wall 214 is configured to be mounted to the boom assembly 130 (FIG. 1), as introduced above. The interior portion 220 formed by the C-shaped base bracket 200 houses the actuation assembly 400, also referenced above. In further examples, the base bracket 200 may have other arrangements or shapes.

The hose guide 280 is mounted within the interior portion 220, e.g., to the underside of top wall 214, and forms an air hose guide section 282 and a fluid hose guide section 284. The air hose guide section 282 supports and guides the air hose 500 into the first hinge joint 320, and generally, into the retractable arm 300. Similarly, the fluid hose guide section 284 supports and guides the fluid hose 500 into the first hinge joint 320, and generally, into the retractable arm 300.

Figure 9:
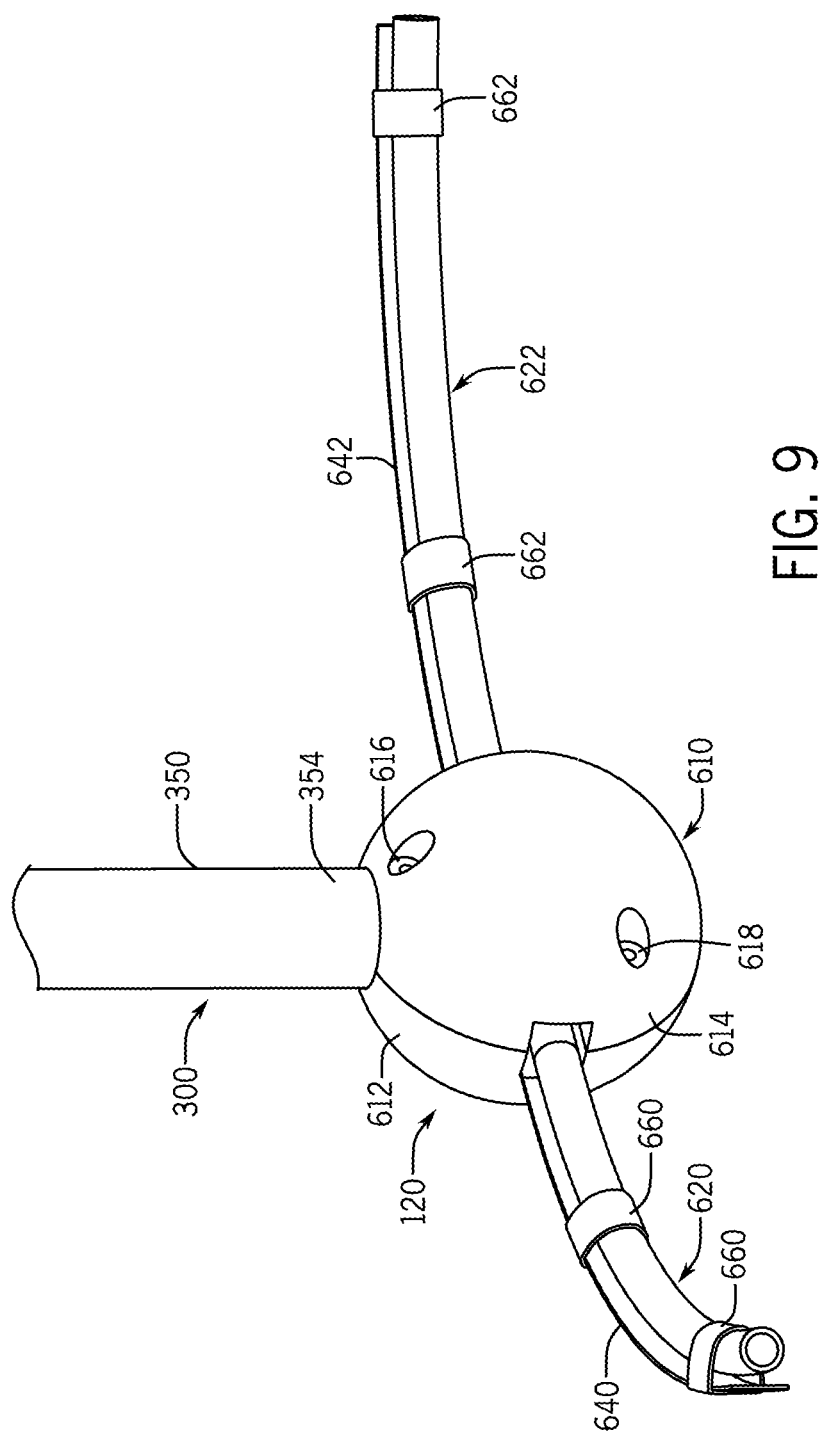
FIG. 9 is a rear view of a spray device on the drop apparatus of FIG. 4.
Figure 10:
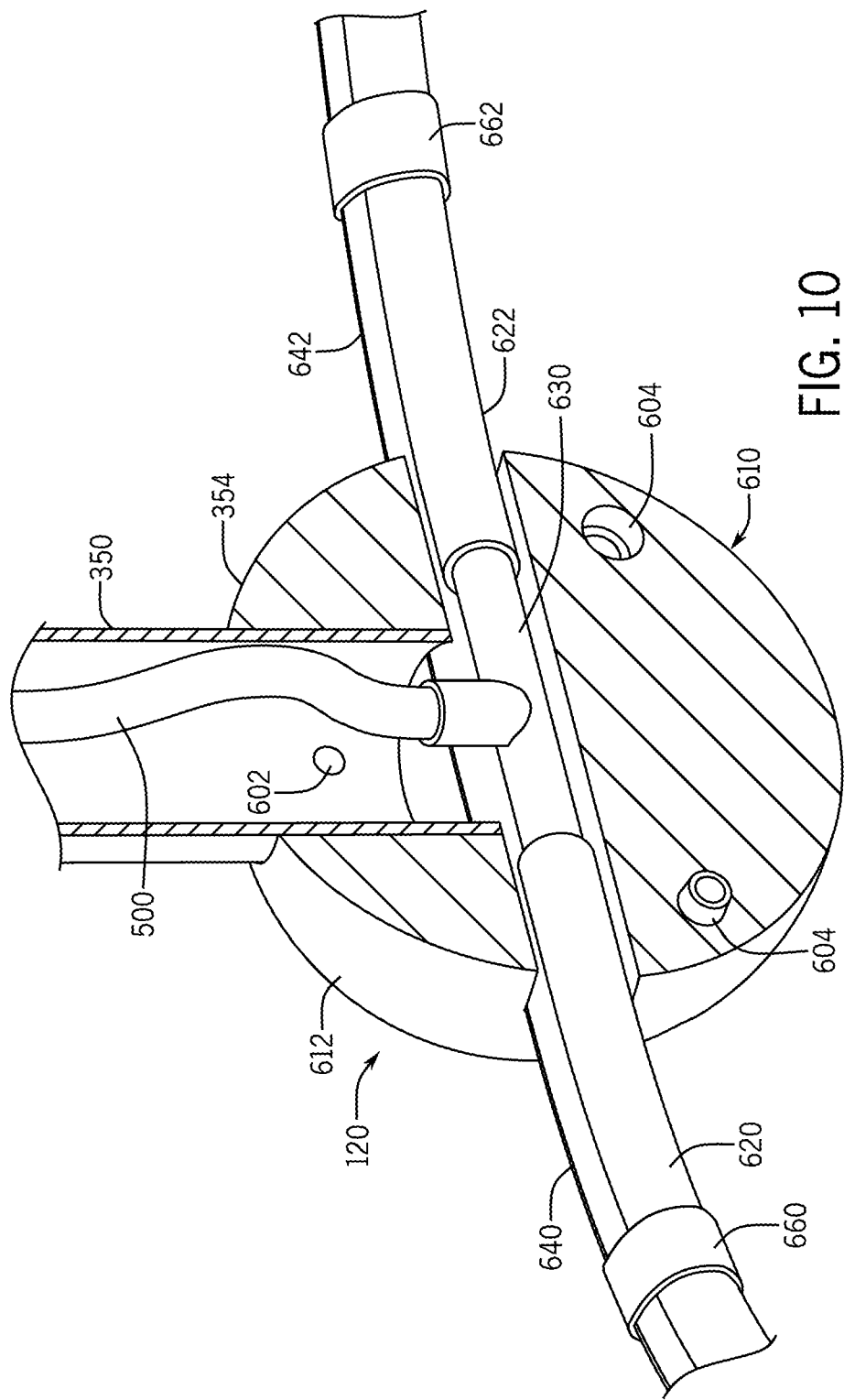
FIG. 10 is a cross-sectional view of the spray device of FIG. 9.

FIGS. 9 and 10 more clearly depict the spray device 120. In particular, FIG. 9 is an isometric rear view of the spray device 120, and FIG. 10 is a closer, cross-sectional rear view of the spray device 120.

As shown, the spray device 120 may be in the form of a ball guide 610 attached to the distal end of the retractable arm 300, particularly the second end 354 of the third arm segment 350. The ball guide 610 may be formed by first and second hemisphere portions 612, 614 joined together and secured to the arm 300 with fasteners 616, 618. Generally, the ball guide 610 functions to support left and right hose branches 620, 622 that are fluidly coupled to the fluid hose 500 at a hose fitting 630 within the ball guide 610, as best shown by FIG. 10.

As also shown by FIG. 10, the first hemisphere portion 612 includes channels to accommodate the second end 354 of the third arm segment 350, the hose fitting 630, and the left and right hose branches 620, 622. Although not shown in FIG. 10, the second hemisphere portion 614 may be generally identical to the first hemisphere portion 612 such that the hemisphere portions 612, 614, when joined, secure the spray device 120 to the retractable arm 300. As best shown in FIG. 10, the second end 354 of the of third arm segment 350 may include a mounting through hole 602 to enable the fastener 618 (FIG. 9) to mount the hemisphere portions 612, 614 of the ball guide 610 to the retractable arm 300. Mounting holes 604, also depicted in FIG. 10, enable fasteners 616 to couple the hemisphere portions 612, 614 to one another.

The interior of the first and second hemisphere portions 612, 614 further accommodate the hose fitting 630 and secure the ends of the hose branches 620, 622 to enable distribution of the fluid. In particular, during operation, fluid from the fluid hose 500 flows vertically downward into the hose fitting 630 and is distributed into the left and right hose branches 620, 622 for application onto ground or crop positions at the ends of the branches 620, 622, such as on two adjacent rows of crops.

The spray device 120 may include hose support strips 640, 642 that extend along at least a portion of the lengths of the branches 620, 622. The support strips 640, 642 may be secured to the branches 620, 622 with support straps 660, 662. In one example, the support strips 640, 642 may have sufficient stiffness to maintain the generally horizontal orientation of the branches 620, 622 relative to the ground and the generally lateral orientation of the branches 620, 622 relative to the direction of travel, although the support strips 640, 642 may be provided to maintain any desirable orientation.

As introduced above, the boom assembly 130 may include folding arrangements 136, and in one embodiment, the retractable drop apparatuses 170 may cooperate with the folding arrangements 136 in order to facilitate compact and efficient storage and transport. As examples, FIG. 11 is a partial top view of the boom assembly 130, and FIG. 12 is a partial side isometric view of the boom assembly 130.

Figure 11:
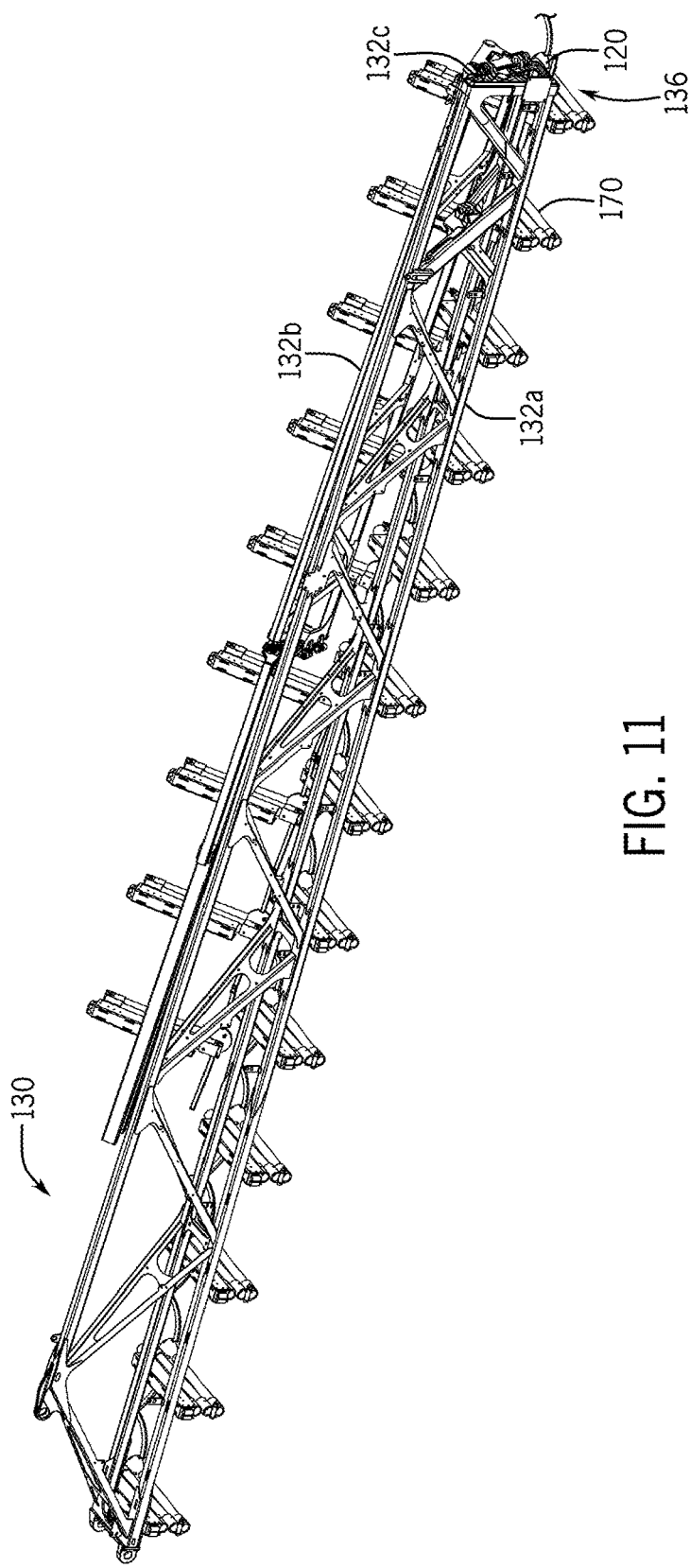
FIGS. 11 and 12 are partial isometric and side views of the boom of FIG. 2.

Reference is initially made to FIG. 11, which particularly depicts portions of inner section 132a and outer section 132b joined at hinge 132c. Portions of the drop apparatuses 170 and spray devices 120 are also depicted in FIG. 11. In the depicted example of FIG. 11, the folding arrangement 136 is formed by the hinge 132c, which is arranged such that the outer section 132b may be pivoted counterclockwise. Although not shown, actuation devices may be provided to drive the folding of the outer section 132b, while in other embodiments, the outer section 132b may be manually folded. Locking or securement devices may further be provided to maintain the outer section 132b in the unfolded or extended position and/or in the folded position.

Figure 12:
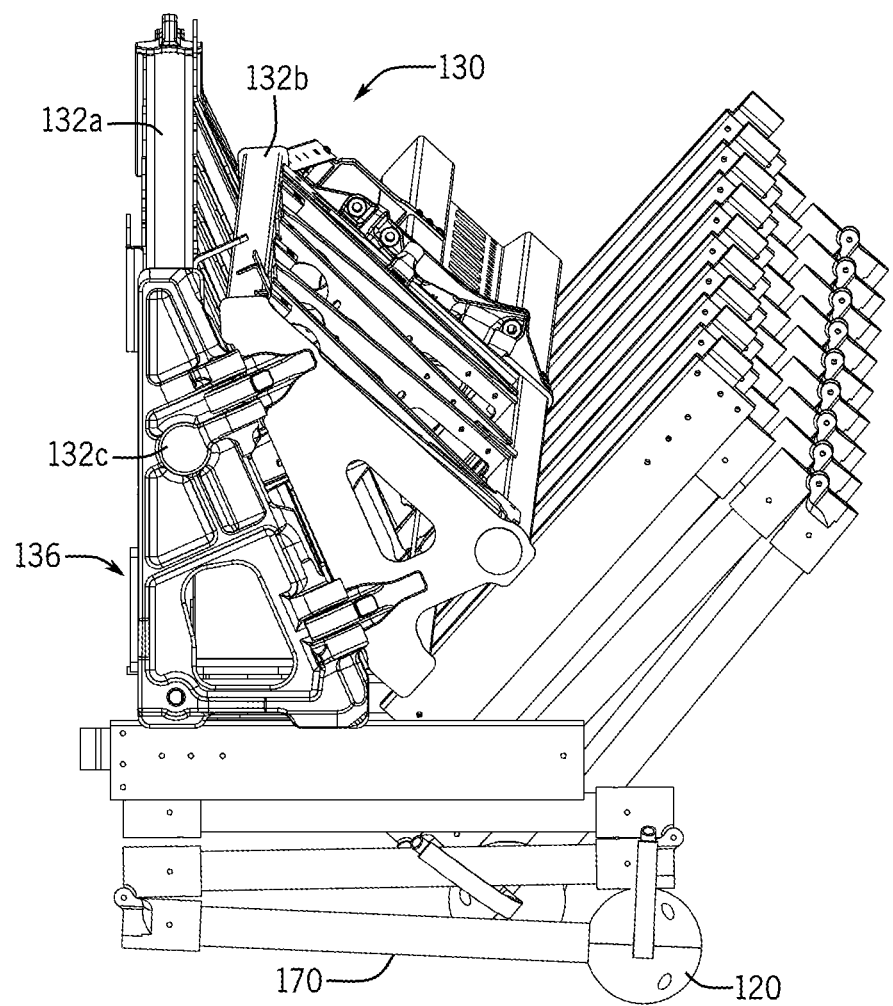

FIG. 12 is a view of the boom sections 132a, 132b in the folded position. As shown, the drop apparatuses 170 are retracted during the folding operation to provide a relatively compact arrangement. In this position, the branches of the spray devices 120 may be interlaced one another to generally prevent or mitigate tangles or damage.

As introduced above, the retraction and extension of the drop apparatuses 170 may be automatically managed by the controller 150. In other examples, the actuation may be initiated by the operator in the cab. The drop apparatuses 170 may be actuated individually, in groups, or as a whole.

In one embodiment, the controller 150 may actuate the drop apparatuses 170 as part of the overall operation of the machine 100. As an example of such operation, the controller 150 may determine when the machine 100 is nearing the end of a set of rows, such as indicated by distance traveled or location sensors. Upon reaching the end of the rows, the controller 150 may send a signal to one or more of the actuation assemblies 400 to retract the corresponding drop apparatuses 170 to prevent and/or mitigate damage to the crops at the end of the rows as the machine 100 turns to begin fluid application on an adjacent set of rows. As noted above, some or all of the drop apparatuses 170 may be retracted, as determined by the controller 150 or according to a preprogrammed plan. When the machine 100 is in the proper position, the controller 150 may send a signal to the actuation assemblies 400 of the retracted drop apparatuses 170 to return to the extended positions for continued application of fluid.

In some embodiments, the controller 150 may further actuate the drop apparatuses 170 in cooperation with the folding arrangements 136. For example, upon encountering an obstacle on one side or a more narrow section of rows for which one or both of the booms 132, 134 are too wide, the controller 150 may identify the boom section 132b, 134b to be folded, retract the drop apparatuses 170 for that section 132b, 134b, and then initiate the folding operation into a more compact arrangement.

In some instances, the sprayer system described above may be implemented as a method for applying fluids to agricultural crops. As an example, in a first step, the sprayer system may receive an initiation signal from an operator in the cab or other source, such as a remote command. In response, the sprayer system may initiate operation, which may include preparing machine systems, fluids in the sprayer system, downloading programs or plans, and the like. The sprayer system may then travel to the designated area for fluid application. Upon arrival, the booms may be unfolded (if stored in the folded position), and subsequently, the drop apparatuses may be extended (if stored in retracted positions). At this point, the sprayer system may begin operation by driving down the designated set of rows and applying fluids from the storage tank via the plumbing and spray devices. As necessary, the sprayer system may retract and extend the drop apparatuses and fold and unfold the boom assembly. Upon completion of the task, the sprayer system may retract the drop apparatuses, fold the boom assembly, maneuver into a storage position, and shut down.

Accordingly, the examples discussed above provide systems and methods with drop apparatuses, each having an arm that retracts and extends primarily along an upright reference (or vertical) axis to reposition the spray devices. This enables more versatile sprayer system and/or a work machine with more compact dimensions without adding undue weight and/or complexity.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A sprayer system of a work machine with a boom, a fluid source, and an air source, the sprayer system comprising:
    a spray device configured to selectively apply a fluid from the fluid source to an agricultural crop; and
    a drop apparatus comprising:
        a retractable arm with a first end coupled to the boom and a second end coupled to the spray device, the retractable arm including a first arm segment, a second arm segment, a first hinge joint positioned in between the first arm segment and the boom such that the first arm segment is selectively foldable relative to the boom, and a second hinge joint positioned in between the first arm segment and the second arm segment such that the second arm segment is selectively foldable relative to the first arm segment; and
        an actuation assembly coupled to the retractable arm to selectively fold and unfold the first arm segment relative to the boom at the first hinge joint and the second arm segment relative to the first arm segment at the second hinge joint based on air pressure from the air source.

2. The sprayer system of claim 1, wherein the retractable arm further includes a third arm segment coupled to the second arm segment and a third hinge joint positioned in between the second arm segment and the third arm segment such that the third arm segment is selectively foldable relative to the second arm segment.

3. The sprayer system of claim 2, wherein the spray device is mounted on the third arm segment.

4. The sprayer system of claim 1, wherein the drop apparatus includes a base bracket that mounts the first hinge joint and the first arm segment of the retractable arm to the boom.

5. The sprayer system of claim 4,
    wherein the actuation assembly includes an air hose fluidly coupled to the air source and extending at least through the first hinge joint, the first arm segment, and the second hinge joint, and wherein the air hose, upon being pressurized by the air source, is configured to stiffen such that the first arm segment is unfolded relative the boom at the first hinge joint and the second arm segment is unfolded relative to the first arm segment at the second hinge joint.

6. The sprayer system of claim 5, wherein the actuation assembly further comprises a retraction device configured to pull at least the first arm segment and the second arm segment into a folded position when the air hose is unpressurized.

7. The sprayer system of claim 6,
wherein the retraction device includes:
   a spring with first and second ends, the first end of the spring being anchored to the base bracket, and
   a cable extending from the second end of the spring to a position proximate the second end of the retractable arm,
wherein the spring is extended under tension when the air hose is pressurized and the first arm segment and the second arm segment are unfolded, and
wherein, when the air hose is unpressurized, the spring retracts to pull the first arm segment and the second arm segment into the folded position via the cable.

8. The sprayer system of claim 7, wherein the cable extends at least partially through the first arm segment and the second arm segment.

9. The sprayer system of claim 1, further comprising a fluid hose fluidly coupled to the fluid source and extending through the retractable arm to the spray device.

10. The sprayer system of claim 9, wherein the spray device includes a ball guide supporting a first hose branch fluidly coupled to the fluid hose and a second hose branch fluidly coupled to the fluid hose.

11. The sprayer system of claim 10, wherein the ball guide is formed by a first hemisphere portion and a second hemisphere portion that collectively secure the spray device to the retractable arm, the ball guide further including a hose fitting housed within the first and second hemisphere portions to fluidly couple the first and second hose branches to the fluid hose.

12. An agricultural work machine, comprising:
a chassis;
an engine mounted on the chassis for propelling the work machine;
a boom extending from at least one side of the chassis; and
a sprayer system comprising:
   a tank coupled to the chassis;
   an air source coupled to the chassis;
   at least one spray device arranged to selectively apply a fluid from the tank to an agricultural crop; and
   at least one drop apparatus comprising:
      a retractable arm with a first end coupled to the boom and a second end coupled to the at least one spray device, the retractable arm including a first arm segment, a second arm segment, a first hinge joint positioned in between the first arm segment and the boom such that the first arm segment is selectively foldable relative to the boom, and a second hinge joint positioned in between the first arm segment and the second arm segment such that the second arm segment is selectively foldable relative to the first arm segment; and
      an actuation assembly coupled to the retractable arm to selectively fold and unfold the first arm segment relative to the boom at the first hinge joint and the second arm segment relative to the first arm segment at the second hinge joint based on air pressure from the air source.

13. The agricultural work machine of claim 12, wherein the retractable arm further includes a third arm segment coupled to the second arm segment and a third hinge joint positioned in between the second arm segment and the third arm segment such that the third arm segment is selectively foldable relative to the second arm segment, the spray device being mounted on the third arm segment.

14. The agricultural work machine of claim 12, wherein the drop apparatus includes a base bracket that mounts the first hinge joint and the first arm segment of the retractable arm to the boom.

15. The agricultural work machine of claim 14,
wherein the actuation assembly includes an air hose fluidly coupled to the air source and extending at least through the first hinge joint, the first arm segment, and the second hinge joint, and
wherein the air hose, upon being pressurized by the air source, is configured to stiffen such that the first arm segment is unfolded relative the boom at the first hinge joint and the second arm segment is unfolded relative to the first arm segment at the second hinge joint.

16. The agricultural work machine of claim 15, wherein the actuation assembly further comprises a retraction device configured to pull at least the first arm segment and the second arm segment into a folded position when the air hose is unpressurized.

17. The agricultural work machine of claim 16, wherein the retraction device includes:
   a spring with first and second ends, the first end of the spring being anchored to the base bracket, and
   a cable extending from the second end of the spring to a position proximate the second end of the retractable arm, the cable extending at least partially through the first arm segment and the second arm segment,
wherein the spring is extended under tension when the air hose is pressurized and the first arm segment and the second arm segment are unfolded, and
wherein, when the air hose is unpressurized, the spring retracts to pull the first arm segment and the second arm segment into the folded position via the cable.

18. The agricultural work machine of claim 17, further comprising a fluid hose fluidly coupled to the fluid source and extending through the retractable arm to the at least one spray device.

19. The agricultural work machine of claim 18, wherein the at least one spray device includes a ball guide supporting a first hose branch fluidly coupled to the fluid hose and a second hose branch fluidly coupled to the fluid hose.

20. The agricultural work machine of claim 19, wherein the ball guide is formed by a first hemisphere portion and a second hemisphere portion that collectively secure the at least one spray device to the retractable arm, the ball guide further including a hose fitting housed within the first and second hemisphere portions to fluidly couple the first and second hose branches to the fluid hose.

* * * * *

UNITED STATES PATENT AND TRADEMARK OFFICE
CERTIFICATE OF CORRECTION

PATENT NO. : 10,440,942 B2  
APPLICATION NO. : 15/890594  
DATED : October 15, 2019  
INVENTOR(S) : Barker et al.

Page 1 of 1

It is certified that error appears in the above-identified patent and that said Letters Patent is hereby corrected as shown below:

In the Claims

In Column 14, Claim 18, Line 49, delete "the fluid source" and insert -- the tank --, therefor.

Signed and Sealed this  
Seventh Day of January, 2020

Andrei Iancu  
*Director of the United States Patent and Trademark Office*